US008953224B2

(12) United States Patent
Mok et al.

(10) Patent No.: US 8,953,224 B2
(45) Date of Patent: Feb. 10, 2015

(54) OPERATING DEVICE USABLE WITH IMAGE FORMING APPARATUS AND IMAGE FORMING APPARATUS HAVING THE SAME

(75) Inventors: Young Jae Mok, Suwon-si (KR); Kwang Hyok Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 232 days.

(21) Appl. No.: 12/875,194

(22) Filed: Sep. 3, 2010

(65) Prior Publication Data

US 2011/0080620 A1 Apr. 7, 2011

(30) Foreign Application Priority Data

Oct. 7, 2009 (KR) ........................ 10-2009-0094900

(51) Int. Cl.
*H04N 1/00* (2006.01)
*G03G 15/00* (2006.01)
*G06F 3/12* (2006.01)
*H04N 1/04* (2006.01)
*E05D 5/12* (2006.01)
*E05D 5/10* (2006.01)
*E05D 11/10* (2006.01)

(52) U.S. Cl.
CPC ....... *H04N 1/00496* (2013.01); *H04N 1/00384* (2013.01); *H04N 1/00408* (2013.01); *G03G 15/5016* (2013.01); *H04N 1/00533* (2013.01); *H04N 1/00535* (2013.01); *H04N 2201/0093* (2013.01); *H04N 2201/0091* (2013.01); *H04N 2201/0082* (2013.01)
USPC ............ 358/401; 358/1.15; 358/486; 16/380; 16/381; 16/386; 16/319

(58) Field of Classification Search
CPC ............ H04N 1/00; H04N 2201/0094; H04N 2201/0096; G03G 15/00; G03G 15/5016; G03G 15/502; E05D 3/06; E05D 3/18; E05D 3/183; E05D 3/186
See application file for complete search history.

(56) References Cited

U.S. PATENT DOCUMENTS 6,795,662 B2 * 9/2004 Kudo .............................. 399/81
6,804,861 B2 * 10/2004 Hsu ................................ 16/366

(Continued)

FOREIGN PATENT DOCUMENTS

CN 1721202 1/2006

OTHER PUBLICATIONS

European Search Report dated Feb. 11, 2013 issued in European Application No. 10176437.1.

(Continued)

*Primary Examiner* — Fred Guillermety
*Assistant Examiner* — Henok A Shiferaw
(74) *Attorney, Agent, or Firm* — Staas & Halsey LLP

(57) ABSTRACT

An operating device usable with an image forming apparatus to increase free movement thereof and an image forming apparatus having the same. A sliding unit and a hinge unit provided at a rear surface of the operating device can provide increased free movement of the operating device. A horizontal sliding motion of the operating device can be provided by a the sliding unit, and the sliding unit can be rotated relative to a body of the image forming apparatus with the hinge unit. The sliding unit can include a first sliding member and a second sliding member to slide on the first sliding member. The hinge unit can include a hinge shaft and a bracket rotatably coupled to the hinge shaft.

12 Claims, 9 Drawing Sheets

(56) References Cited

U.S. PATENT DOCUMENTS

| | | | |
|---|---|---|---|
| 7,062,197 B2* | 6/2006 | Kunugi | 399/107 |
| 2002/0191980 A1 | 12/2002 | Kudo | |
| 2005/0024688 A1 | 2/2005 | Inada et al. | |
| 2005/0175371 A1* | 8/2005 | Kunugi | 399/107 |
| 2007/0077108 A1 | 4/2007 | Kawasaki | |
| 2008/0316541 A1* | 12/2008 | Takata et al. | 358/401 |

OTHER PUBLICATIONS

Chinese Office Action dated Feb. 28, 2014 issued in CN Application No. 201010502424.X.

* cited by examiner

OPERATING DEVICE USABLE WITH IMAGE FORMING APPARATUS AND IMAGE FORMING APPARATUS HAVING THE SAME

CROSS-REFERENCE TO RELATED APPLICATIONS

This application claims the benefit of Korean Patent Application No. 2009-0094900, filed on Oct. 7, 2009 in the Korean Intellectual Property Office, the disclosure of which is incorporated herein by reference in its entirety.

BACKGROUND

1. Field of the Invention

Embodiments of the present general inventive concept relate to an operating device usable with an image forming apparatus to increase free movement thereof and an image forming apparatus having the same.

2. Description of the Related Art

Generally, image forming apparatuses are devised to form an image on paper according to input signals. Examples of image forming apparatuses include printers, copiers, fax machines, and devices combining functions thereof.

In an electro-photographic image forming apparatus as a kind of image forming apparatuses, light is irradiated to a photoconductor that has been charged with a predetermined electric potential to form an electrostatic latent image on a surface of the photoconductor. Thereafter, a developer supply unit supplies developer to the electrostatic latent image to form a visible image. The visible image, formed on the photoconductor, is directly transferred to paper, or is indirectly transferred to the paper by way of an intermediate transfer unit. The image transferred to the paper is fixed to the printing medium via a fusing process.

The image forming apparatus includes an operating device to operate a variety of functions of the image forming apparatus. The operating device contains operating buttons to directly input a command and a display to show a variety of information.

However, the operating device has been conventionally installed near a paper discharge unit and thus, may hinder free manual activity of a user.

Further, the operating device has been kept at a fixed position, causing restriction in spatial utility.

SUMMARY

Therefore, exemplary embodiments of the present general inventive concept can provide an operating device usable with an image forming apparatus to increase free movement thereof and an image forming apparatus having the same.

Additional features and utilities of the present general inventive concept will be set forth in part in the description which follows and, in part, will be obvious from the description, or may be learned by practice of the present general inventive concept.

Exemplary embodiments of the present general inventive concept provide an operating device usable with an image forming apparatus having increased spatial utility and an image forming apparatus having the same.

Exemplary embodiments of the present general inventive concept provide an operating device usable with an image forming apparatus to increase free manual activity of a user near a paper discharge unit and an image forming apparatus having the same.

Additional features and utilities of the invention will be set forth in part in the description which follows and, in part, will be obvious from the description, or may be learned by practice of the invention.

Exemplary embodiments of the present general inventive concept can provide an image forming apparatus includes a body including at least one of an image reading device to read an image recorded on a document and a printing device to print an image on paper, and an operating device coupled to a side of the body to operate the image forming apparatus, wherein the operating device includes a hinge unit to rotate the operating device, and a sliding unit to horizontally move the operating device.

The sliding unit may be provided at a rear surface of the operating device to slide the operating device, and the hinge unit may connect the sliding unit and the body to each other.

The hinge unit may include a hinge shaft coupled to the body, and a bracket fixed to the sliding unit to rotatably couple the hinge shaft and the sliding unit to each other.

The sliding unit may include a first sliding member fixed to the bracket, and a second sliding member fixed to the rear surface of the operating device to slide on the first sliding member.

The operating device may further include a damper unit to absorb force applied by a user during sliding motion of the operating device.

The damper unit may include a damper gear member to generate resistance force against sliding motion of the operating device, and a toothed gear portion horizontally formed at the rear surface of the operating device so that the damper gear member is seated and moved thereon.

The operating device may include a rear cap to cover the rear surface of the operating device, and the rear cap may include a first rear cap to enclose at least the hinge unit, and a second rear cap installed to be horizontally moved relative to the first rear cap, the second rear cap covering a part of the first rear cap.

The damper gear member may include a damper gear containing a viscous material therein, and a boss integrally formed with the damper gear and fixed to the first rear cap.

The operating device may further include a housing, and a supporting frame inside the housing, and the second sliding member may be fastened to the housing and the supporting frame.

The hinge unit may further include a connection member to rotatably couple the hinge shaft and the bracket to each other, and the connection member may include a spacer washer to minimize friction between elements, a stopper to set a rotation angle, a disc spring to provide elasticity, a guide washer to minimize relative movement of elements due to rotation, and a tightening nut to adjust a rotation torque.

The operating device may further include a display to show operation information of the image forming apparatus, and an operating button part to receive an input of an operation command for the image forming apparatus, the display and the operating button part being provided at a front surface of the operating device.

Exemplary embodiments of the present general inventive concept may also provide an image forming apparatus includes a body, an image reading device provided at an upper side of the body to read an image recorded on a document, a printing device provided at a lower side of the body to print an image on paper, a discharge unit provided in the printing device to discharge paper, and an operating device coupled to a front surface of the body to operate the image forming apparatus, where the operating device includes a moving unit to rotate and horizontally move of the operating device to assure free manual activity of a user near the discharge unit.

The moving unit may include a sliding unit to slide the operating device, and a hinge unit to enable rotation of the operating device.

The sliding unit may be provided at a rear surface of the operating device to slide the operating device, and the hinge unit may connect the sliding unit and the body to each other.

The hinge unit may include a hinge shaft coupled to the body, and a bracket fixed to the sliding unit to rotatably couple the hinge shaft and the sliding unit to each other.

The sliding unit may include a first sliding member fixed to the bracket, and a second sliding member fixed to the rear surface of the operating device to slide on the first sliding member.

The operating device may further include a damper unit to absorb force applied by a user during sliding motion of the operating device.

The operating device may include a rear cap to cover the rear surface of the operating device, and the rear cap may include a first rear cap to enclose at least the hinge unit, and a second rear cap installed to be horizontally moved relative to the first rear cap, the second rear cap covering a part of the first rear cap.

Exemplary embodiments of the present general inventive concept, an operating device of an image forming apparatus coupled to a side of a body of the image forming apparatus, includes a sliding unit horizontally move the operating device and a hinge unit to rotate the operating device, wherein the sliding unit is provided at a rear surface of the operating device so as to move the operating device relative to the body, and the hinge unit connects the sliding unit and the body to each other to move the operating device relative to the body.

Exemplary embodiments of the present general inventive concept also provide an operating device of an image forming apparatus, including a supporting frame, a sliding unit coupled to the supporting frame to move the operating device along a first direction, and a hinge unit coupled to the sliding unit to rotate the operating device about an axis of rotation.

The operating device may also include a damper unit to smooth the horizontal movement of the operating device in the first direction, where the damper unit generates a resistance force to minimize the sliding of the operating device in the first direction.

The damper unit of the operating device may also include a damper gear to generate a resistance force against a sliding force along the first direction, and a toothed gear that the damper gear is seated and moved thereon.

The damper gear of the operating device may include a viscous material formed therein to generate at least a portion of the resistance force.

The hinge unit of the operating device may include a hinge shaft, and at least one bracket to rotatably couple the hinge shaft.

The operating device may include where the at least one bracket is coupled to the hinge unit.

The sliding unit of the operating device may include a first sliding member coupled to the hinge unit, and a second sliding member coupled to the support frame.

The operating device may include a display coupled to display operating information of the image forming apparatus, and one or more operating keys to control at least one operation of the image forming apparatus.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
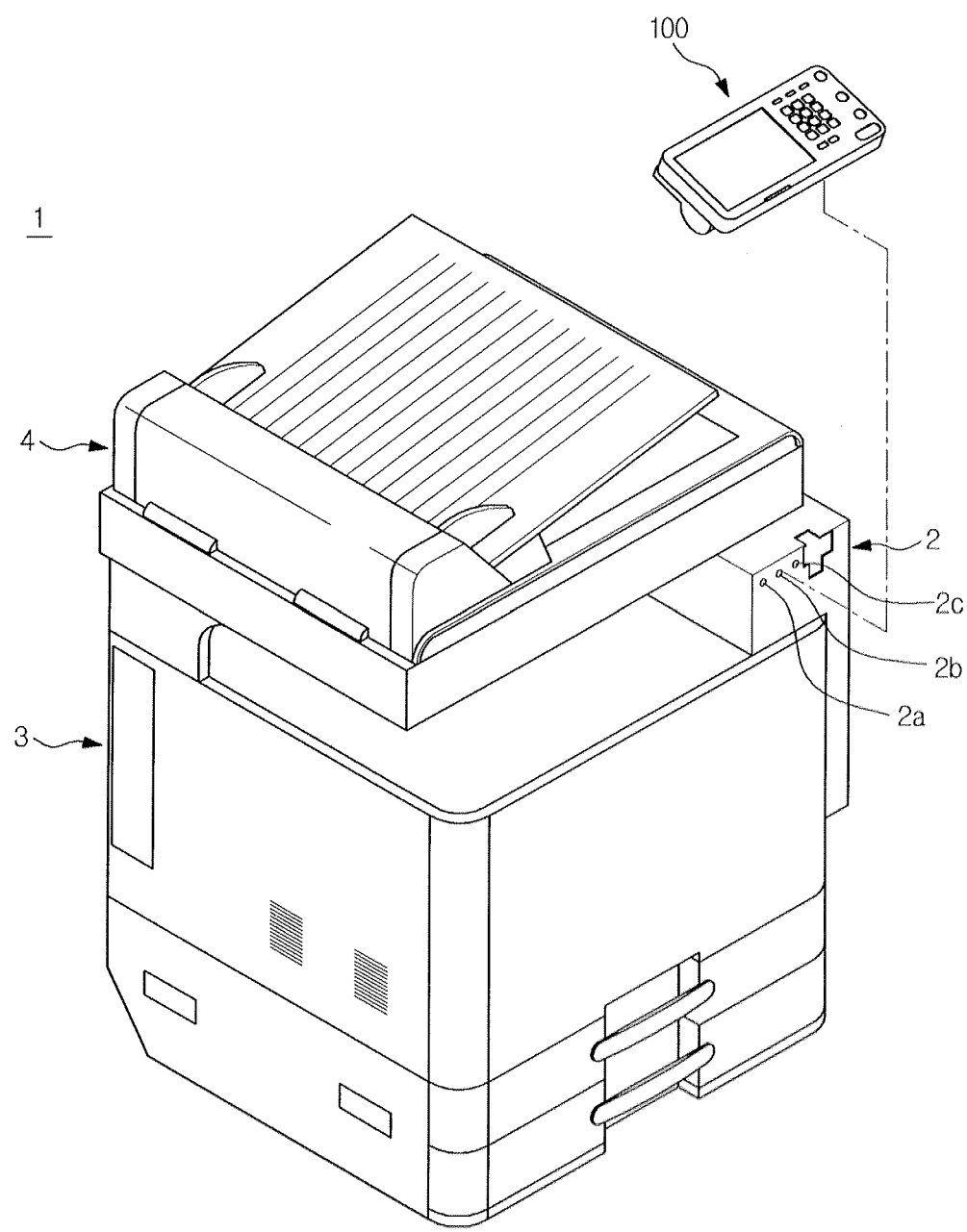
FIG. 1 is a perspective view illustrating an exterior appearance of an image forming apparatus according to exemplary embodiments of the present general inventive concept.

Reference will now be made in detail to the embodiments of the present invention, examples of which are illustrated in the accompanying drawings, wherein like reference numerals refer to like elements throughout. The embodiments are described below in order to explain the present general inventive concept by referring to the figures.

Figure 2:
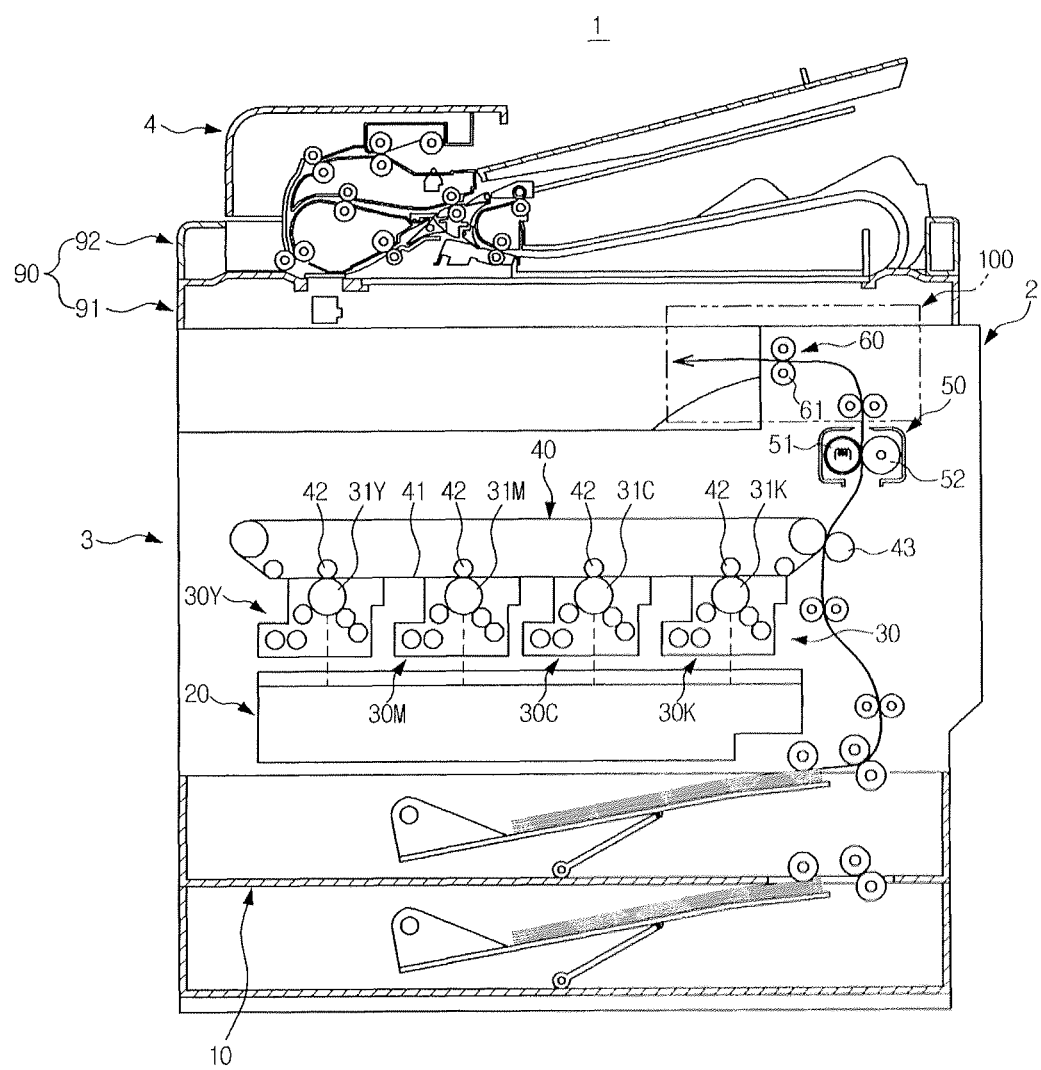
FIG. 2 is a view illustrating an interior configuration of the image forming apparatus according to exemplary embodiments of the present general inventive concept.

FIG. 1 is a perspective view illustrating an exterior of an image forming apparatus according to exemplary embodiments of the present general inventive concept, and FIG. 2 is a view illustrating an interior configuration of the image forming apparatus according to exemplary embodiments of the present general inventive concept.

As illustrated in FIGS. 1 and 2, the image forming apparatus 1 can include a body 2, a printing device 3 installed below the body 2 to print an image on paper, an image reading device 4 installed on the body 2 to read an image recorded in a document, and a operating device 100 coupled to a side surface of the body 2.

The printing device 3 can print an image according to signals input from the image reading device 2 or an external appliance, such as, e.g., a Personal Computer (PC), a server, a digital storage device, and/or from any other suitable external appliance to carry out the exemplary embodiments of the present general inventive concept as disclosed herein. The printing device 3 can also print an image according to signals received via a communications network to which the image forming apparatus 1 can be communicatively coupled. The printing device 3 can include a paper supply unit 10, a light scanning unit 20, a developing unit 30, a transfer unit 40, a fusing unit 50 and a discharge unit 60.

The paper supply unit 10 can hold one or more media upon which an image can be printed on by the image forming apparatus 1. The media stored in the paper supply unit 10 can include paper and/or any other suitable media upon which an image can be printed according to the exemplary embodiments of the present general inventive concept disclosed herein. The paper supply unit 10 can supply media (e.g., paper) to the transfer unit 40, as discussed in detail below.

The light scanning unit 20 can irradiate light corresponding to image information to photoconductors 31K, 31C, 31M and 31Y to form electrostatic latent images on surfaces of the photoconductors 31K, 31C, 31M and 31Y.

The developing unit 30 can supply developer to the electrostatic latent images of the photoconductors 31K, 31C, 31M and 31Y to form visible images. The developing unit 30 may include four developing units 30K, 30C, 30M and 30Y in which different color developers, e.g., black, cyan, magenta and yellow developers are respectively received.

The transfer unit 40 can include an intermediate transfer belt 41, first transfer rollers 42 and a second transfer roller 43. The visible images formed on the photoconductors 31K, 31C, 31M and 31Y can be transferred to the intermediate transfer belt 41 by the first transfer rollers 42 and, in turn, the resulting image on the intermediate transfer belt 41 is transferred to paper fed from the paper supply unit 10 when the paper is passing between the second transfer roller 43 and the intermediate transfer belt 41.

When the paper has passed through the transfer unit 40, the paper can enter the fusing unit 50. The fusing unit 50 can include a heating roller 51 and a press roller 52. When the paper, on which the image has been transferred, passes between the heating roller 51 and the press roller 52, the image can be fixed to the paper upon receiving heat and pressure.

When the paper has passed through the fusing unit 50, it can be guided to the discharge unit 60 and discharged outside the printing device 3 by discharge rollers 61.

The image reading device 4 can include a reading device body 90 having a frame 91 and a cover 92.

Hereinafter, the operating device 100 usable with the image forming apparatus 1 will be described in detail.

Figure 3:
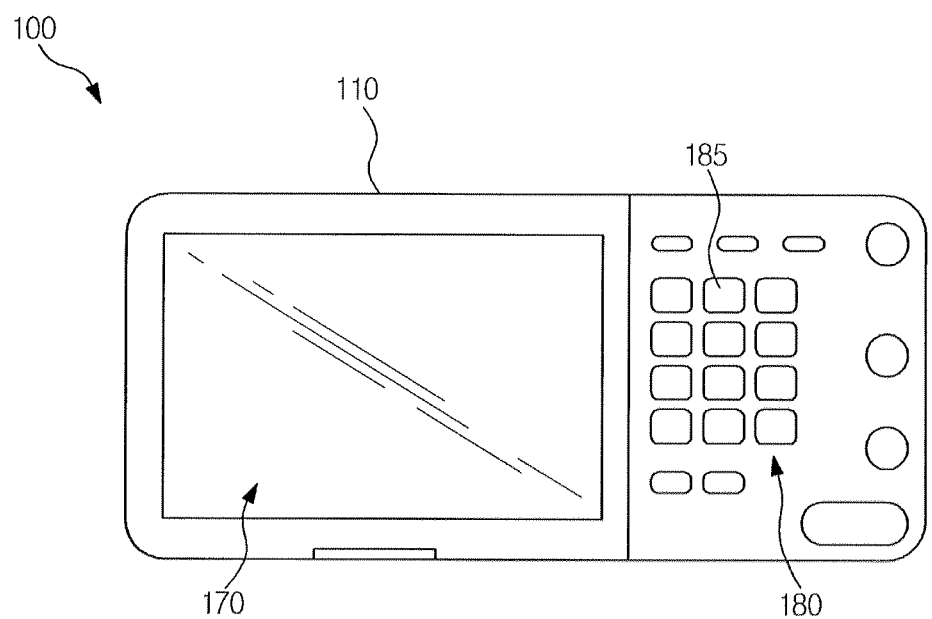
FIG. 3 is a view illustrating a front surface of an operating device according to exemplary embodiments of the present general inventive concept.
Figure 4:
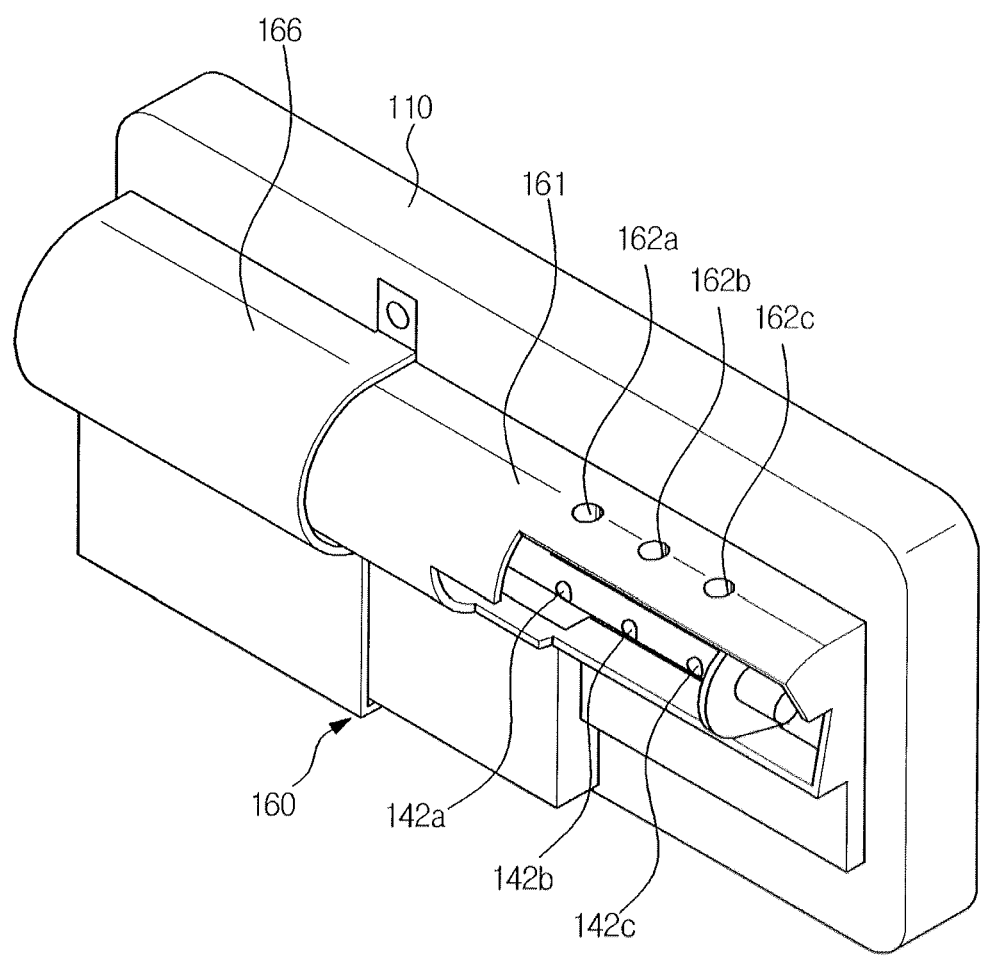
FIG. 4 is a rear perspective view illustrating a rear surface of the operating device according to exemplary embodiments of the present general inventive concept.
Figure 5:
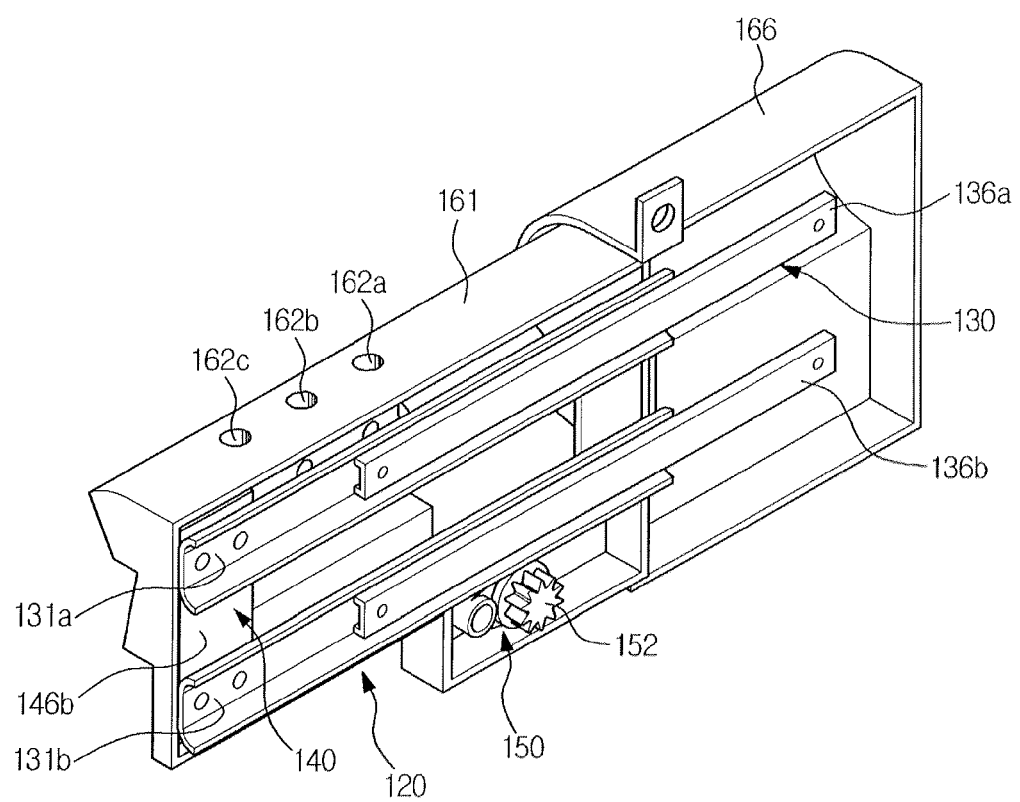
FIG. 5 is a perspective view illustrating an interior coupled state of FIG. 4 according to exemplary embodiments of the present general inventive concept.
Figure 6:
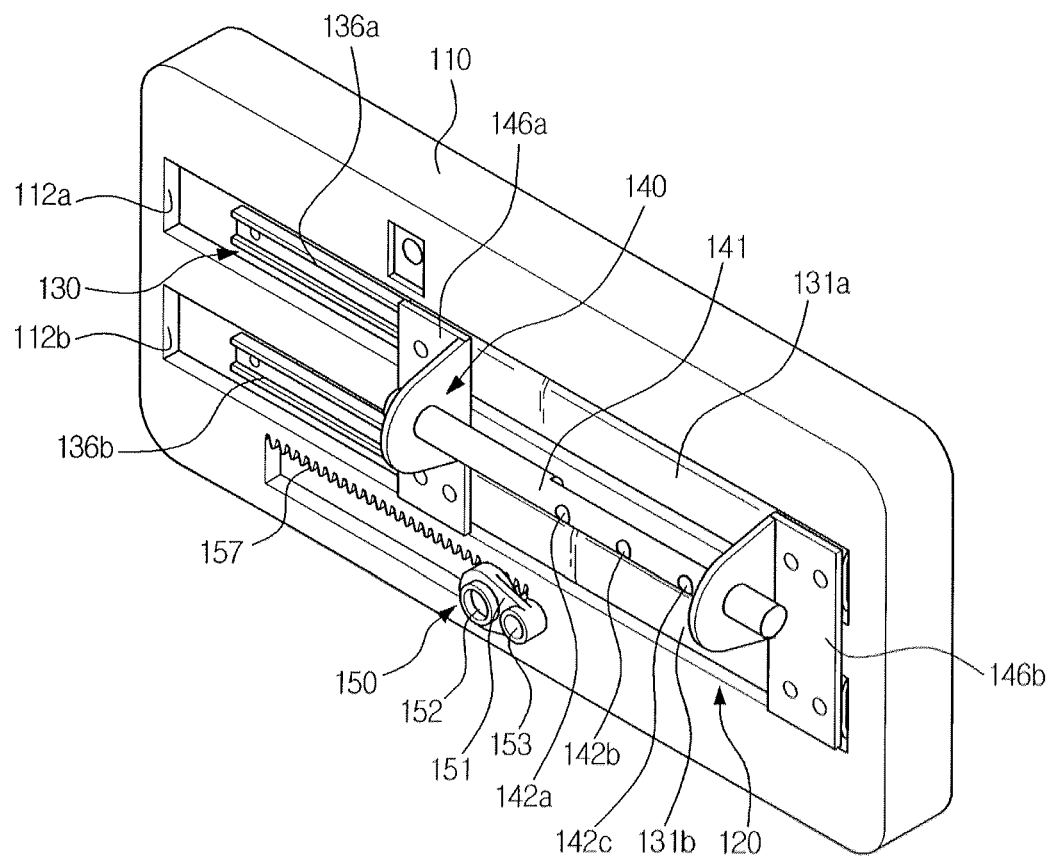
FIG. 6 is a perspective view illustrating the operating device after removal of a rear cap according to exemplary embodiments of the present general inventive concept.
Figure 7:
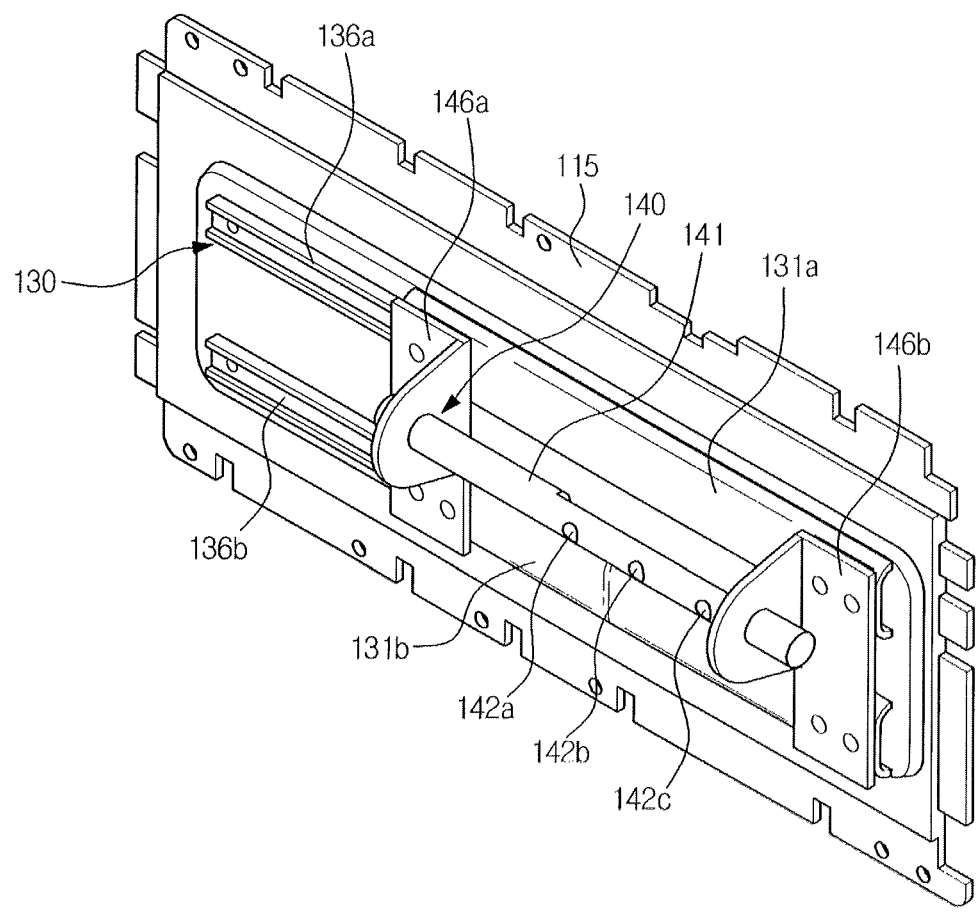
FIG. 7 is a rear perspective view illustrating an interior coupled state of the operating device according to exemplary embodiments of the present general inventive concept.
Figure 8:
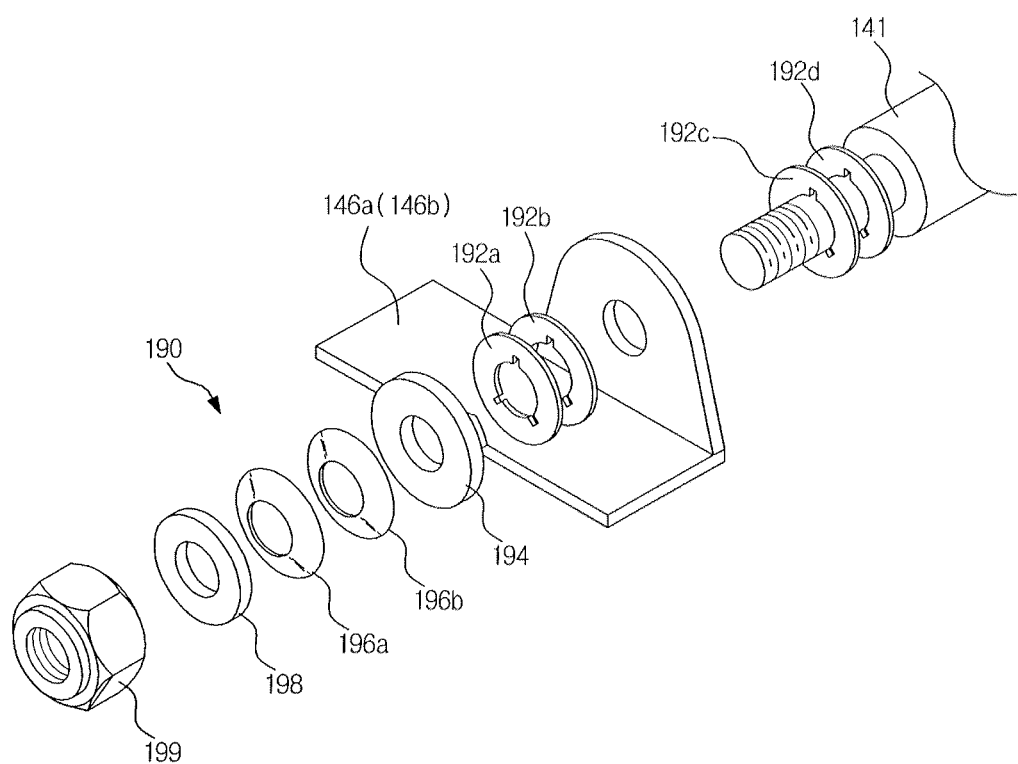
FIG. 8 is a perspective view illustrating a coupled state of a hinge unit according to exemplary embodiments of the present general inventive concept.

FIG. 3 is a view illustrating a front surface of the operating device, FIG. 4 is a perspective view illustrating a rear surface of the operating device, FIG. 5 is a perspective view illustrating an interior coupled state of FIG. 4, FIG. 6 is a rear perspective view of the operating device after removal of a rear cap, FIG. 7 is a rear perspective view illustrating an interior coupled state of the operating device, and FIG. 8 is a perspective view illustrating a coupled state of a hinge unit according to exemplary embodiments of the present general inventive concept.

The operating device 100 can operate and/or control the image forming apparatus 1. As illustrated in FIG. 3, the operating device 100 can include a housing 110, a display 170 to display a variety of information related to the image forming apparatus 1, and an operating button part 180 to receive at least one input command to operate the image forming apparatus 1.

The display 170 can be an image forming display and can display information related to the operation and/or control of the image forming apparatus 1. The display 170 can be a touch screen to receive selections of one or more functions via a screen.

The operating button part 180 can include one or more operating keys 185. If the user pushes and/or selects one of the keys 185, the image forming apparatus 1 can perform an operation corresponding to the selected one of the keys 185. That is, the keys 185 of the operating button part 180 can receive user input and/or selections to operate and/or control the image forming apparatus 1. The keys 185 may be touch keys.

As illustrated in FIG. 4, a rear cap 160 can cover a rear surface of the operating device 100. The rear cap 160 can include a first rear cap 161 and a second rear cap 166. The first rear cap 161 can enclose at least a hinge unit 140, which will be described hereinafter. In exemplary embodiments of the present general inventive concept, the first rear cap 161 can enclose the hinge unit 140 and at least a portion of an area adjacent thereto. The second rear cap 166 can be horizontally movable relative to the first rear cap 161 and can cover at least a part of the first rear cap 161.

The first rear cap 161 can have cap holes 162a, 162b and 162c. Bolts (not illustrated) that can penetrate through the cap holes 162a, 162b and 162c of the first rear cap 161 can be fastened through hinge shaft holes 142a, 142b and 142c of the hinge unit 140 and body holes 2a, 2b and 2c of the body 2, thereby coupling the operating device 100 to the body 2. Accordingly, the operating device 100 may be separated from the body 2 by unfastening the bolts.

FIGS. 5 and 6 illustrate an interior coupled state of the operating device 100 inside the rear cap 160. The operating device 100 can include a moving unit 120 arranged inside the rear surface thereof so that the operating device 100 can rotate and/or move horizontally. The moving unit 120 can include the hinge unit 140 such that the operating device 100 is rotatable about an axis, a sliding unit 130 such that the operating device 100 can be moved horizontally, and a damper unit 150 so as to smooth the horizontal movement of the operating device 100.

The sliding unit 130 can be provided at the rear surface of the operating device 100 so that the operating device 100 can slide in a horizontal direction. The sliding unit 130 can include first sliding members 131a and 131b fixed to brackets 146a and 146b of the hinge unit 140, and second sliding members 136a and 136b fitted in housing slots 112a and 112b of the operating device 100 such that the first sliding members 131a and 131b are slidable.

The first sliding members 131a and 131b and the second sliding members 136a and 136b can correspond to each other in a longitudinal direction of the operating device 100. In exemplary embodiments of the present general inventive concept, two upper sliding members and two lower sliding members can be provided.

More specifically, the first sliding members 131a and 131b can be fixed to the hinge unit 140, the second sliding members 136a and 136b can be fitted in the housing 110, and the hinge unit 140 can be fixed to the body 2 of the image forming apparatus 1. Accordingly, the operating device 100 can horizontally slide as the second sliding members 136a and 136b horizontally slide relative to the first sliding members 131a and 131b.

The hinge unit 140 can include a hinge shaft 141 coupled to the body 2, the hinge shaft 41 can be a rotation center, and the brackets 146a and 146b can be fixed to the first sliding members 131a and 131b of the sliding unit 130 to rotatably couple the hinge shaft 41 and the sliding unit 130 to each other.

The hinge shaft 141 can be a center shaft to rotate of the operating device 100. As the bolts (not illustrated) are fastened through the hinge shaft holes 142a, 142b and 142c and the body holes 2a, 2b and 2c of the body 2, the hinge shaft 141 can be coupled to the body 2.

The brackets 146a and 146b can be connection mediums between the hinge shaft 141 and the sliding unit 130 to allow the sliding unit 130 to be rotated relative to the hinge shaft 141 fixed to the body 2. The brackets 146a and 146b can be coupled to the first sliding members 131a and 131b of the sliding unit 130 so as to be kept stationary, but can be rotatably coupled to the hinge shaft 141. The coupling between the brackets 146a and 146b and the hinge shaft 141 will be described hereinafter.

The damper unit 150 can absorb at least a portion of the force applied by the user during horizontal sliding motion of the operating device 100. Specifically, when the user applies force to the operating device 100 to horizontally move the operating device 100, sliding motion may occur that may damage the moving unit 120 and other elements. The damper unit 150 can provide resistance force against the force applied by the user so as to increase smooth horizontal movement of the operating device 100.

The damper unit 150 can include a damper gear member 151 to generate a resistance force against a horizontal sliding motion of the operating device 100, and a toothed gear portion 157 horizontally formed at the rear surface of the operating device 100 such that the damper gear member 151 may be seated and moved thereon.

The damper gear member 151 can include a damper gear 152 having a viscous material therein, and a boss 153 that can be integrally formed with the damper gear 152 and fixed to the first rear cap 161.

When the user applies force to horizontally move the operating device 100, the damper gear 152 having a viscous material therein can generate a resisting force against sliding motion of the operating device 100 to minimize and/or prevent excessive sliding motion.

The operating device 100, as illustrated in FIG. 7, can include a supporting frame 115 arranged inside the housing 110 to construct a framework of the operating device 100. The supporting frame 115 can increase the strength of the operating device 100 to increase stable horizontal movement and rotation of the operating device 100. The second sliding members 136a and 136b can be coupled to the supporting frame 115, in addition to being fitted in the housing slots 112a and 112b. Specifically, since the operating device 100 may sustain damage to constituent elements thereof due to rotation and horizontal motion thereof when only the housing 110 is coupled to the second sliding members 136a and 136b, the supporting frame 115 can be provided to reinforce the operating device 100.

The hinge shaft 141 and the brackets 146a and 146b, as illustrated in FIG. 8, can be rotatably coupled to each other via connection members 190. Each of the connection members 190 can include spacer washers 192a, 192b, 192c and 192d to minimize friction between elements, a stopper 194 to set a predetermined rotation angle, disc springs 196a and 196b to provide elasticity, a guide washer 198 to minimize relative movements of elements of the hinge unit 140 due to rotation, and a tightening nut 199 to adjust a rotation torque.

When the spacer washers 192a, 192b, 192c and 192d are arranged at an outer side of the corresponding bracket 146a or 146b and one end of the hinge shaft 141 is fitted to the bracket 141, the stopper 194, disc springs 196a, 196b, guide washer 198 and tightening nut 199 can be sequentially coupled.

Hereinafter, horizontal movement and rotation of the operating device 100 will be described.

Figure 9:
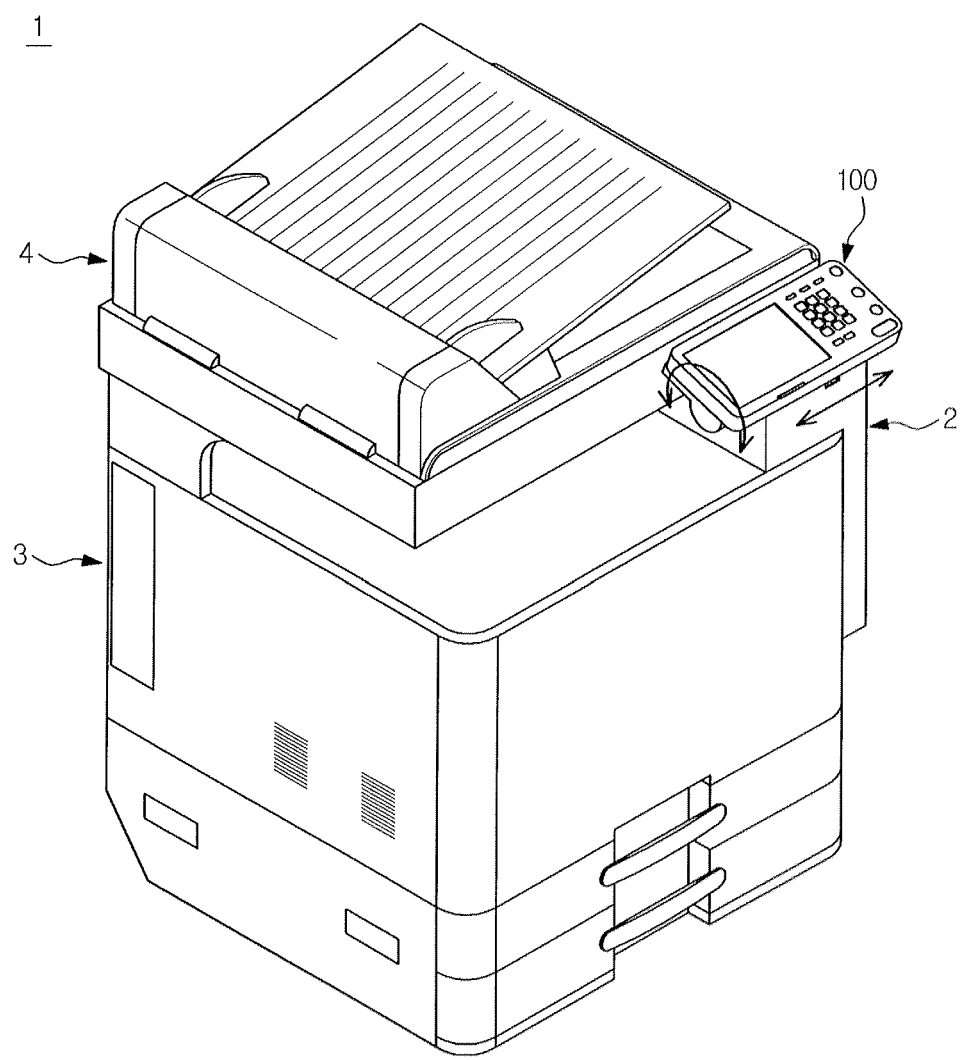
FIG. 9 is a view illustrating horizontal movement and rotation of the operating device according to exemplary embodiments of the present general inventive concept.

FIG. 9 is a view illustrating horizontal movement and rotation of the operating device according to exemplary embodiments of the present general inventive concept.

When the user applies force in a horizontal direction of the operating device 100, the second sliding members 136a and 136b inside the rear cap 160 of the operating device 100 can be moved relative to the first sliding members 131a and 131b fixed to the body 2. In this case, the damper gear 152 can generate a resistance force against sliding motion of the operating device 100. The second rear cap 166 can be moved horizontally along with the housing 110. The first rear cap 161 can be fixed to the boss 153 of the damper gear member 151 and can be kept stationary. In this way, the user may stop the horizontally moving operating device 100 at a selected position. The operating device 100 can be kept in a semi-fixed condition at the selected position by at least the resistance force provided by the damper gear 152.

If the user applies force to rotate the operating device 100, the hinge shaft 141 can be fixed to the body 2 and the brackets 146a and 146b can be rotated relative to the hinge shaft 141. The stopper 194 may set a rotation angular range of the brackets 146a and 146b, and the tightening nut 199 may adjust a rotation torque of the rotating brackets 146a and 146b. Once the brackets 146a and 146b are rotated, the sliding unit 130 and the housing 110 connected to the brackets 146a and 146b can be rotated together. The user may stop the rotating operating device 100 at a selected position, and the operating device 100 may be kept in a semi-fixed condition at least by the rotation resistance of the tightening nut 199.

The horizontal movement and rotation of the operating device 100 may be accomplished simultaneously.

As horizontal movement and rotation of the operating device 100 are increased, the user may perform free manual activity near the discharge unit 60.

The above described configuration also may increase spatial utility around the operating device 100.

The hinge unit 140, the sliding unit 130 and the damper unit 150 for rotational and horizontal movement of the operating device 100 can be arranged so as not to be exposed to the outside, providing the image forming apparatus 1 with a superior exterior appearance.

Moreover, when the operating device 100 malfunctions, the operating device 100 may be separated from the body 2 by unfastening the bolts penetrating through the hinge shaft 141 and the body 2, to increase repairability and exchange of the operating device 100.

As apparent from the above description, an operating device usable with an image forming apparatus according to exemplary embodiments of the present general inventive concept may freely perform rotation and horizontal movement thereof.

The operating device may increase free manual activity near a paper discharge unit.

Further, enhanced spatial utility around the operating device may be increased.

Although several embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:
1. An image forming apparatus comprising:
a body including at least one of an image reading device to read an image recorded on a document and a printing device to print an image on paper; and
an operating device coupled to a side of the body to operate the image forming apparatus;
wherein the operating device includes:
a housing;
a hinge unit to rotate the housing;
a sliding unit to horizontally move the housing; and
a damper unit to smooth the horizontal movement of the housing, wherein the hinge unit includes a hinge shaft fixed to the body, at least one hinge shaft hole formed through an outer circumferential surface of the hinge shaft and at least one bracket rotatably coupled to the hinge shaft, with fasteners disposed through the hinge shaft holes so as to couple the hinge shaft to the body, and wherein the sliding unit includes a first sliding member fixed to the bracket, and a second sliding member fixed to the rear surface of the housing to slide on the first sliding member to allow the housing to perform a relative sliding movement in a horizontal direction with respect to the hinge shaft which is fixed to the body.

2. The image forming apparatus according to claim 1, wherein:
the operating device includes a rear cap to cover the rear surface of the housing; and
the rear cap includes a first rear cap to enclose at least the hinge unit, and a second rear cap installed to be horizontally moved relative to the first rear cap, the second rear cap covering a part of the first rear cap.

3. The image forming apparatus according to claim 1, wherein:
the operating device further includes a supporting frame inside the housing; and
the second sliding member is fastened to the housing and the supporting frame.

4. The image forming apparatus according to claim 1, wherein:
the hinge unit further includes a connection member to rotatably couple the hinge shaft and the bracket to each other; and
the connection member includes a spacer washer to minimize friction, a stopper to set a rotation angle, a disc spring to provide elasticity, a guide washer to minimize relative movement of elements due to rotation, and a tightening nut to adjust a rotation torque.

5. The image forming apparatus according to claim 1, wherein the operating device further includes a display to show operation information of the image forming apparatus, and an operating button part to receive an input of an operation command for the image forming apparatus, the display and the operating button part being provided at a front surface of the operating device.

6. An image forming apparatus comprising:
a body;
an image reading device provided at an upper side of the body to read an image recorded on a document;
a printing device provided at a lower side of the body to print an image on paper;
a discharge unit provided in the printing device to discharge paper; and
an operating device coupled to a front surface of the body to operate the image forming apparatus,
wherein the operating device includes a housing and a moving unit to rotate and horizontally move the housing, and
wherein the moving unit includes:
a hinge unit to rotate the housing and to keep the housing in a semi-fixed condition;
a sliding unit to horizontally move the housing; and
a damper unit to smooth the horizontal movement of the housing and to keep the housing in at least a semi-fixed condition,
wherein the hinge unit includes a hinge shaft fixed to the body, at least one hinge shaft hole formed through an outer circumferential surface of the hinge shaft with at least one fastener disposed through the at least one hinge shaft hole so as to couple the hinge shaft to the body, and at least one bracket rotatably coupled to the hinge shaft, and wherein the sliding unit includes a first sliding member fixed to the bracket, and a second sliding member fixed to the rear surface of the housing to slide on the first sliding member to allow the housing to perform a relative sliding movement in a horizontal direction with respect to the hinge shaft which is fixed to the body.

7. The image forming apparatus according to claim 6, wherein the damper unit includes a damper gear member to generate a resistance force against a sliding motion of the housing, and a toothed gear portion horizontally formed at the rear surface of the housing so that the damper gear member is seated and moved thereon.

8. An operating device of an image forming apparatus coupled to a side of a body of the image forming apparatus, comprising:
a housing;
a hinge unit to rotate the housing;
a sliding unit to horizontally move the housing; and
a damper unit to smooth the horizontal movement of the housing,
wherein the hinge unit connects the sliding unit and the body to each other so as to move the operating device relative to the body, the hinge unit including a hinge shaft fixed to the body, at least one hinge shaft hole formed through an outer circumferential surface of the hinge shaft with at least one fastener disposed through the at least one hinge shaft hole so as to couple the hinge shaft to the body, and at least one bracket rotatably coupled to the hinge shaft,
wherein the sliding unit moves the housing relative to the body, the sliding unit includes a first sliding member fixed to the bracket, and a second sliding member fixed to the rear surface of the housing to slide on the first sliding member to allow the housing to perform a relative sliding movement in a horizontal direction with respect to the hinge shaft which is fixed to the body, and
wherein the damper unit generates the resistance force to minimize horizontal sliding of the operating device.

9. An operating device of an image forming apparatus, comprising:
a housing;
a supporting frame inside the housing;
a sliding unit coupled to the supporting frame to move the housing along a first direction;
a hinge unit coupled to the sliding unit to rotate the housing about an axis of rotation; and
a damper unit to smooth the horizontal movement of the housing, the damper unit including a damper gear to generate a resistance force against a sliding force along a first direction and a toothed gear that the damper gear is seated and moved thereon,
wherein the hinge unit includes a hinge shaft fixed to a body of the image forming apparatus, at least one hinge shaft hole formed through an outer circumferential surface of the hinge shaft with at least one fastener disposed through the at least one hinge shaft hole so as to couple the hinge shaft to the body, and at least one bracket rotatably coupled to the hinge shaft, and
wherein the sliding unit includes a first sliding member fixed to the bracket, and a second sliding member fixed to the supporting frame to slide on the first sliding member to allow the housing to perform a relative sliding movement in a horizontal direction with respect to the hinge shaft which is fixed to the body.

10. The operating device of claim 9, further comprising:
a display coupled to display operating information of the image forming apparatus; and
one or more operating keys to control at least one operation of the image forming apparatus.

11. The image forming apparatus according to claim 1, wherein the damper unit includes a damper gear member to generate a resistance force against a sliding motion of the housing, and a toothed gear portion horizontally formed at the rear surface of the housing so that the damper gear is seated and moved thereon.

12. The image forming apparatus according to claim 7, wherein:
the operating device includes a rear cap to cover at least the rear surface of the housing; and
the rear cap includes a first rear cap to enclose the hinge unit and around thereof, and a second rear cap installed to be horizontally moved relative to the first rear cap, the second rear cap covering a part of the first rear cap.

* * * * *

UNITED STATES PATENT AND TRADEMARK OFFICE
CERTIFICATE OF CORRECTION

| | | |
|---|---|---|
| PATENT NO. | : 8,953,224 B2 | Page 1 of 1 |
| APPLICATION NO. | : 12/875194 | |
| DATED | : February 10, 2015 | |
| INVENTOR(S) | : Young Jae Mok | |

It is certified that error appears in the above-identified patent and that said Letters Patent is hereby corrected as shown below:

On the Title Page

Column 2, Item [57] (Abstract), line 7, in Claim 12, delete "a the" and insert -- a --, therefor.

Signed and Sealed this
Twenty-sixth Day of May, 2015

Michelle K. Lee
*Director of the United States Patent and Trademark Office*